United States Patent

Atherton et al.

[15] 3,700,713
[45] Oct. 24, 1972

[54] NITROGEN-CONTAINING COMPOUNDS

[72] Inventors: John Heathcote Atherton, Stevenston; John Beckett Plumb, West Kilbride, both of Scotland

[73] Assignee: Imperial Chemical Industries Limited, Millbank, England

[22] Filed: July 10, 1969

[21] Appl. No.: 840,853

[30] Foreign Application Priority Data

July 26, 1968 Great Britain..........35,859/68

[52] U.S. Cl.......260/448.2 N, 117/124 F, 117/135.1, 252/8.8, 260/239 R, 260/448.2 B, 260/448.2 E, 260/448.8 R
[51] Int. Cl.............................C07f 7/10, C07f 7/18
[58] Field of Search...260/448.2 N, 448.2 E, 448.8 R

[56] References Cited

UNITED STATES PATENTS

| | | | |
|---|---|---|---|
| 3,284,479 | 11/1966 | Windemuth et al.... | 260/448.8 R |
| 3,288,754 | 11/1966 | Green ............. | 260/448.2 N X |
| 3,440,261 | 4/1969 | Saam...................... | 260/448.2 |
| 3,485,803 | 12/1969 | Mazerolles...... | 260/448.2 N X |
| 3,567,753 | 3/1971 | Delaval et al....... | 260/448.2 N |

*Primary Examiner*—James E. Poer
*Assistant Examiner*—P. F. Shaver
*Attorney*—Cushman, Darby & Cushman

[57] ABSTRACT

Nitrogen-containing compounds comprising organosilicon compounds containing at least one unit of the average general formula $$B_s(DO)_tA_rSiO_{\frac{4-r-s-t}{2}}$$

where A is a group of the general formula $$-R[OR'\overset{O}{\overset{\|}{C}}N(R^2)R^3NR^4R^5]_c$$

in which R is an organic group free from olefinic unsaturation and having a valency of $c + 1$ and is selected from the group consisting of hydrocarbon groups having from three to 11 carbon atoms and groups consisting of carbon, hydrogen and oxygen, the latter in the form of ethereal linkages, having from six to 17 carbon atoms, $R^1$ is selected from the group consisting of lower alkylene groups, $R^2$ is selected from the group consisting of hydrogen, hydrocarbyl groups having not more than 12 carbon atoms and groups of the general formula $[R^3NRR^4R^5]$, $R^3$ is a divalent radical attached at its extremities to two nitrogen atoms and is selected from the group consisting of hydrocarbon groups having not more than 12 carbon atoms, polyimino groups of the general formula $[(R^7NH)_qR^8]$ where $R^7$ and $R^8$ are alkylene groups having not more than four carbon atoms and $q$ is a positive integer not greater than 100, and groups forming a heterocyclic structure with the amino nitrogen and $R^4$ or with $R^2$, $R^4$ and the two nitrogen atoms attached to the extremities of $R^3$, $R^4$, when not a member of a heterocyclic structure, is selected from the group consisting of hydrogen, hydrocarbyl and hydroxy substituted hydrocarbyl groups and amino-alkyl and N-substituted amino-alkyl groups, $R^5$ is selected from the group consisting of hydrogen, hydrocarbyl groups, hydroxy substituted hydrocarbyl groups, amino-alkyl and N-substituted amino-alkyl groups, $c$ is 1, 2 or 3, B is a hydrocarbyl group free from aliphatic unsaturation, D is selected from the group consisting of hydrocarbyl groups and groups of the general formula $B(OC_nH_{2n})_x$, $r$ is 1 or 2, $s$ is 0, 1, 2, or 3, $t$ is 0, 1, 2 or 3 and $r + s + t$ is not greater than 4.

11 Claims, No Drawings

NITROGEN-CONTAINING COMPOUNDS

This invention relates to nitrogen-containing compounds and more particularly to new nitrogen-containing silanes and siloxanes.

According to the present invention a new class of nitrogen-containing compounds comprises organosilicon compounds containing at least one unit of the average general formula

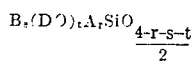

amine oxides and metal co-ordination compounds derived therefrom, where A is a group of the general formula

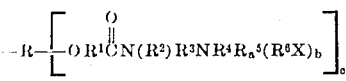

in which R is an organic group free from olefinic unsaturation and having a valency of $c + 1$ and is selected from hydrocarbon groups having from three to 11 carbon atoms and groups consisting of carbon, hydrogen and oxygen, the latter in the form of ethereal linkages, having from six to 17 carbon atoms, $R^1$ is selected from lower alkylene groups and polyoxyalkylene groups of the general formula $(C_nH_{2n}O)_xC_yH_{2y}$ where $n$ is 2, 3 or 4, $x$ is a positive integer not greater than 100 and $y$ is 1, 2 or 3, $R^2$ is selected from hydrogen, hydrocarbyl groups having not more than 12 carbon atoms, groups of the general formula $[R^3NR^4R_d^5(R^6X)_b]$, groups which form a heterocyclic structure with group $R^3$, the group $R^4$ or the two nitrogen atoms attached to group $R^3$, the group $R^3$ attachment its extremities to the two nitrogen atoms, is selected from hydrocarbon groups having not more than 12 carbon atoms, polyimino groups of the general formula $[(R^7NH)_qR^8]$ where $R^7$ and $R^8$ are alkylene groups having not more than four carbon atoms and $q$ is a positive integer not greater than 100, and groups forming a heterocyclic structure with the amino nitrogen and $R^4$ or with $R^2$, $R^4$ and the two nitrogen atoms attached to the extremities of group $R^3$, $R^4$, when not a member of a heterocyclic structure, is selected from hydrogen, hydrocarbyl groups, hydroxy substituted hydrocarbyl groups, amino-alkyl and N-substituted amino-alkyl groups, $R^5$ is selected from hydrogen, hydrocarbyl groups, hydroxy substituted hydrocarbyl groups, amino-alkyl and N-substituted amino-alkyl groups, $R^6$ is selected from hydrogen, and substituted or unsubstituted alkyl or aralkyl groups, X is selected from halogen atoms, acyloxy groups, sulphate and sulphonate residues, $b$ is 0 or 1, $c$ is 1, 2 or 3 and $d$ is 0 or 1, $d$ being 0 when the three valencies of the nitrogen atom bearing $R^4$ and $R^5$ are employed in forming a heterocyclic structure, B is a hydrocarbyl group free from aliphatic unsaturation, D is a hydrocarbyl group or a group of the general formula $B(OC_nH_{2n})_x$, $r$ is 1 or 2, $s$ is 0, 1, 2 or 3, $t$ is 0, 1, 2 or 3 and $r+s+t$ is not greater than 4.

In the cases where $r+s+t$ equals 4, the organosilicon compound will be a silane and in such cases it is normally preferred that $t$ is not 0. In the cases where $r+s+t$ equals less than 4 the organosilicon compound will be a siloxane. In the case of the siloxanes, not all of the units need be the same and there may be present other siloxanyl units not containing any groups A attached to silicon.

Preferably there is only one group A attached to any one silicon atom, i.e., $r$ is 1. The group R may be selected from a wide variety of groups of valency 2, 3 or 4. Suitable groups include, for example, divalent groups such as 1,3-propylene, 1-methyl-1,3-propylene, 1,1-dimethyl-1,3-propylene, 1,4-butylene, 2-methyl-1,4-butylene, 1,6-hexylene, 1,11-undecylene.

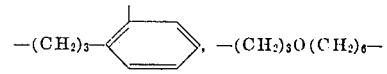

and

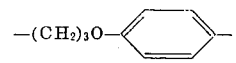

trivalent groups such as

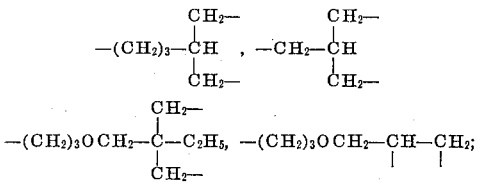

and tetravalent groups such as

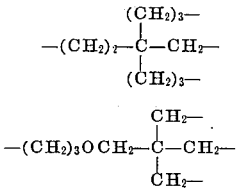

and $$-(CH_2)_3OCH_2-\underset{\underset{CH_2-}{|}}{\overset{\overset{CH_2-}{|}}{C}}-CH_2-$$

In many cases it is, however, preferred that the group R is a 1,3-propylene group.

The group $R^1$ when a lower alkylene group, i.e., having not more than 4 carbon atoms, may be, for example, a methylene, 1,2-ethylene, 1,2-propylene or 1,3-propylene group. When $R^1$ is a group of the general formula $[-(C_nH_{2n}O)_xC_yH_{2y}-]$, it is preferred that x be not more than 10. It is, however, preferred that the group $R^1$ be a methylene or 1,2-ethylene group.

The group $R^2$ may be hydrogen, a group of the general formula $[R^3NR^4R_d^5(R^6X)_b]$ or a hydrocarbyl group having not more than 12 carbon atoms which may be an alkyl, aryl, aralkyl, alkenyl or cycloalkyl group. Suitable hydrocarbyl groups include, for example, methyl, ethyl, n-butyl, undecyl and benzyl groups. In many cases it is preferred that $R^2$ be hydrogen.

The group $R^3$ may be selected from a wide variety of divalent hydrocarbon groups and polyimino groups of the general formula $[(R^7NH)_qR^8]$ or may form a heterocyclic structure with the amino nitrogen and $R^4$ or with $R^2$, $R^4$ and the two nitrogen atoms attached to its extremities. Suitable divalent hydrocarbon groups include, for example, ethylene, 1,3-propylene, 1,6-hexylene and 1,4-phenylene groups. While q may be a positive integer not greater than 100, it is in general preferred that it be not greater than 20. Divalent hydrocarbon groups represented by $R^7$ and $R^8$ may be, for example, ethylene or 1,3-propylene groups. It is also generally preferred that $R^7$ and $R^8$ should have only two or three carbon atoms.

$R^4$, when not a member of a cyclic structure, and $R^5$, which may or may not be alike, may be selected from hydrogen and a wide variety of groups, for example alkyl, aryl or aralkyl groups such as methyl, ethyl, n-propyl and n-butyl groups. It is, however, normally preferred that $R^4$ and $R^5$ be hydrogen or a lower alkyl group. In the cases where the group $R^3$ forms a heterocyclic structure with the amino nitrogen and the group $R^4$, the group $R^5$ will, of course, be absent when all three valencies of the nitrogen are used in the heterocyclic structure. When only two of the amino nitrogen valencies are used in a heterocyclic structure the group $R^5$ may be hydrogen or an alkyl group having not more than 4 carbon atoms.

$R^6$ may be hydrogen, an alkyl or aralkyl group having not more than 12 carbon atoms or such a group substituted by a halogen or a cyano or hydroxy group or an alkoxy-carbonyl group having not more than 10 carbon atoms. Suitable groups include, for example, methyl, ethyl, n-octyl, benzyl and ethoxycarbonylmethyl.

The group X may be a halogen atom, an acyloxy group having not more than 18 carbon atoms or a sulphate or sulphonic acid residue of the general formula $-R''SO_4$ or $R''SO_3$ where $R''$ is hydrogen or an alkyl, aryl or alkaryl group having not more than 20 carbon atoms. Thus, the group X may be, for example, $CH_3COO$, $C_2H_5COO$, $CH_3(CH_2)_3CH(C_2H_5)COO$, $CH_3SO_4$, $CH_3 \cdot C_6H_4SO_3$ or $C_{12}H_{25}C_6H_4SO_3$. For many purposes it is preferred that the group X be chlorine, bromine, iodine or an acetoxy group.

The group B may be selected from alkyl, aryl, aralkyl, alkaryl and cycloalkyl groups and such groups containing substituents such as halogens and cyano groups. Suitable groups include, for example, methyl, ethyl, tetradecyl, octadecyl, cyclohexyl, phenyl, tolyl, benzyl, phenylethyl, chloromethyl, chlorophenyl, beta-cyanoethyl and gamma-cyanopropyl groups. It is, however, frequently preferred that the group B be a methyl group.

The group D may be selected from alkyl, aryl, aralkyl, alkaryl and cycloalkyl groups and groups of the general formula $B(OC_nH_{2n})_x$ where B, n and x are as previously defined. Suitable groups D include, for example, methyl, ethyl, isopropyl, undecyl, cyclohexyl, phenyl, tolyl, benzyl and 2-methoxyethyl groups and groups of the formula $CH_3(OC_2H_4)_{17}$ and $C_6H_{11}(OC_2H_4)_{17}(OC_3H_6)_{13}$.

The siloxanes of our invention may contain, if desired, only one unit of the unit formula specified and the remainder of the groups therein may be selected from the units $Z_3SiO_{0.5}$, $Z_2SiO$, $ZSiO_{1.5}$ and $SiO_2$ in which the group Z is a substituted or unsubstituted hydrocarbyl group. The group Z, which need not necessarily be the same in all units, may be, for example, an alkyl, aryl, aralkyl, alkaryl or cycloalkyl group or such a group containing a substituent such as, for example, a halogen or cyano group. Suitable groups include, for example, methyl, ethyl, tetradecyl, cyclohexyl, phenyl, tolyl, benzyl, phenylethyl, chloromethyl, chlorophenyl, 3,3,3-trifluoropropyl, beta-cyanoethyl and gamma-cyanopropyl groups. The siloxanes of our invention may also contain a small proportion of siloxanyl units containing silicon-bonded hydrogen atoms. It is, however, normally preferred that such units should not be present. Our siloxanes may be linear, branched or cross-linked. Linear siloxanes of our invention include, for example, such as

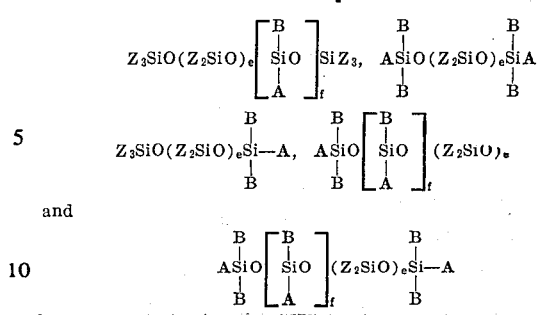

and in which e is 0 or a positive integer and f is a positive integer, it being preferred that e+f be not greater than 100. Branched siloxanes, in addition to the units contained in linear siloxanes, may also contain other units such as $ZSiO_{3/2}$, $ASiO_{3/2}$ and $SiO_2$ units. The molecular weight of the siloxanes may vary widely, for example, up to 500,000 or more. The value of the ratio e:f is normally selected to confer the desired properties on the product.

In one method of preparing the compounds of our invention an organosilicon compound, containing at least one group of the general formula

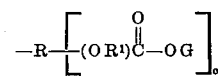

attached directly to silicon and in which R, $R^1$ and c are as hereinbefore defined and the group G is a hydrocarbyl group, preferably a lower alkyl group, for example, such as a methyl, ethyl or propyl group, is reacted with an amino compound of the general formula

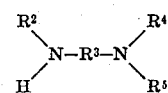

in which $R^2$, $R^3$, R4 and $R^5$ are as hereinbefore defined. Suitable organosilicon compounds for this purpose may be prepared as described in our co-pending Application Ser. No. 36146/67. Reaction proceeds with evolution of the alcohol GOH according to the equation

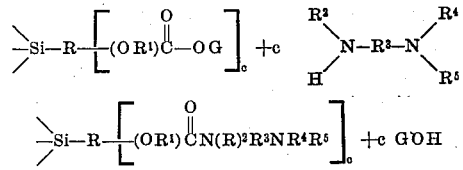

The reaction may be carried out under a wide range of conditions, for example in the temperature range 0 to 250° C. and either with or without a solvent. When a solvent is used it may be chosen from a wide variety of materials including aliphatic, alicyclic and aromatic hydrocarbons, aliphatic and aromatic ethers and lower aliphatic alcohols. Solvents containing groups which are reactive towards amino, ester and alkoxysilyl groups should, of course, be avoided. In many cases, however, particularly when the two reactants are miscible, a solvent is not necessary. One convenient method of carrying out this reaction is to heat the mixture of reactants to a temperature below the boiling point of either of the reactants and of the solvent, if present, but above the boiling point of the alcohol GOH formed in the reaction, and to remove the latter either by distillation or by sparging with an inert gas such as nitrogen. Thus reactants in which the group G is a lower alkyl group, and especially a methyl group, are exceptionally suited to this process. Removal of the alcohol may also be facilitated by operating under reduced pressure. In cases where the amino compound

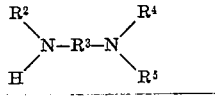

contains only one nitrogen-bonded hydrogen atom, or contains only two nitrogen-bonded atoms, one of which is represented by $R^2$, it is convenient to react together equivalent quantities of the amino compound and the ester.

In cases where more than one of the nitrogen atoms of the amino compound

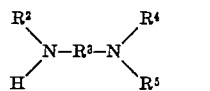

has hydrogen atoms bonded to it, for example where $R^4$ or $R^5$ is hydrogen or an amino-alkyl group bearing nitrogen-bonded hydrogen atoms, or where the group $R^3$ is a polyimino group of the type $-(R^7NH)_qR^8-$, it is usually desirable to employ a quantity of the amino compound in excess of that required for reaction of one mole of the amino compound with one equivalent of ester. Quantities in the range two to 10 times the amount of amine required by the stoichiometry of the reaction are found to be useful. In such cases, the excess amino compound

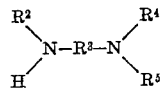

may serve as solvent for the reaction and may be separated from the product by distillation at the completion of the reaction.

In another method of preparing the compounds of our invention a compound of the general formula

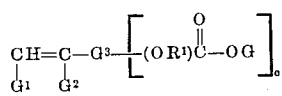

where $R^1$, G and c are as defined and $G^1$, $G^2$ and $G^3$ are groups such that the group

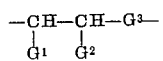

is the same as group R as previously defined, is reacted with an amino compound of the general formula

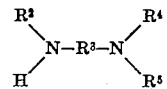

where $R^2$, $R^3$, $R^4$ and $R^5$ are as defined, in the manner described above for reacting an organosilicon compound containing a group of the general formula

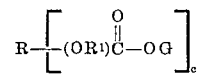

attached directly to silicon with an amino compound of the general formula

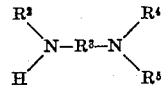

In this way there is obtained an olefinically unsaturated amino compound of the general formula

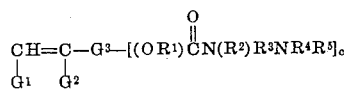

This compound is then reacted with an organosilicon compound containing at least one silicon-bonded hydrogen atom and having at least one unit of the general formula or a polysiloxane containing at least one unit of the general formula

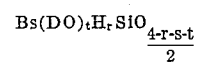

together with one or more other units of the type $Z_3SiO_{0.5}$, $Z_2SiO$, $ZSiO_{1.5}$ and $SiO_2$ in the case of the siloxane molecule, where B, D, Z, r, s and t are as defined above. This method is particularly suitable for the preparation of those compound in which the $-R^3NR^4R^5$ groups contain no nitrogen-bonded hydrogen atoms.

The organosilicon compounds of our invention in which b is 0 may be converted conveniently to their salts, in which b is 1, by any of the general procedures for converting amino compounds to their salts. In many cases all that is required is to mix together thoroughly the amino-silicon compound and the calculated quantity of the compound $R^6X$ in the presence or absence of a suitable solvent. This procedure is found to be particularly suitable for the preparation of acetates and lower alkanoic acid salts, lower alkyl iodides and bromides. In other cases it is sometimes necessary or desirable to heat together the components to effect reaction. The amino oxides and metal complexes are formed from the amines by the conventional processes.

The products of our invention have numerous valuable uses and are especially useful as sizes, for example, for improving the adhesion of organic resins to glass and metals and as polish additives. Our invention also resides in such uses of the said products.

Our invention is further illustrated by the following Examples in which all parts and percentages are by weight.

EXAMPLE 1

A solution of 0.07 part of bis(diethylsulphide)platinous chloride in 390 parts of methyl allyloxyacetate was heated to 100° C. in an atmosphere of dry nitrogen. A solution of 0.07 part of bis(diethylsulphide)platinous chloride in 492 parts of triethoxysilane was added with continuous stirring at a rate such that the temperature of the mixture was maintained in the range 100°–115° C. Addition of the triethoxysiloxane took 1½ hours, and thereafter the temperature of the stirred reaction mixture was maintained in the range 112°–115° C. for 30 minutes, after which it was maintained at 145°–150° C. for a further 3 hours. The mixture was thereafter distilled and unreacted triethoxysilane and ester removed up to a boiling point of 100° C./0.6 mm. Hg. There were thus obtained 540 parts of methyl (γ-triethoxysilyl)propyloxyacetate having boiling point 102°–104° C./0.6 mm. Hg. Analysis, Found C, 49.0 per cent; H, 8.87 per cent; Si, 9.65 per cent; methyl(γ-triethoxysilyl)propyloxyacetate $C_{12}H_{26}O_6Si$ requires C, 49.0 per cent; H, 8.85 per cent; Si, 9.53 per cent.

294 parts of methyl(γ-triethoxysilyl)propylacetate so prepared were added gradually with continuous stirring to 600 parts of 1,2diaminoethane. During the addition process, which took 20 minutes, the temperature of the reaction mixture increased from 17° to 28° C., and continued to rise, reaching a maximum of 30° C. 10 minutes after completion of the addition. The mixture was then stirred for 1 hour, after which it was heated under reflux for 20 minutes. Methanol and excess 1,2-diaminoethane were then removed by distillation up to a pot temperature of 120° C. at 0.8 mm. Hg. There were thus obtained 299 parts of N-β-aminoethyl-(γ-triethoxysilyl)propyloxyacetamide in the form of a clear, almost colorless mobile liquid. Analysis, Found C, 47.0 per cent; H, 9.3 per cent; N, 9.5 per cent; Si, 9.4 per cent. Amine equivalent as determined by titration with standard aqueous HCl (311.5). N-(β-aminoethyl) (γ-triethoxysilyl)propyloxyacetamide, $C_{13}H_{30}ON_2Si$, requires C, 48.5 per cent; H, 9.3 per cent; N, 8.7 per cent; Si, 8.7 per cent. Amine equivalent 322. 10 parts of this material were fractionated at low pressure. There were thus obtained 5.2 parts of distilled N-β-aminoethyl (γ-triethoxysilyl)propyloxyacetamide of boiling point 160°–163° C. at 0.8 mm. Hg. in the form of a clear colorless liquid. Analysis, Found C, 48.5 per cent; H, 9.46 per cent; N, 9.42 per cent; Si, 9.08 per cent. Amine equivalent (as determined by titration with aqueous HCl) 315.

25 sheets of heat-cleaned glasscloth (Marglass 5X P.701) were treated with a 1 per cent aqueous solution of the so prepared silane and air dried for 24 hours at 20° C. and ½ hour at 85° C. The cloth was then impregnated with a commercially available epoxy resin comprising 80 parts of "Araldite" resin MY753 and 20 parts of "Araldite" hardener HY956, piled into a laminate and cured for 24 hours at room temperature between the platens of a light upstroking press with ⅛ inch stops.

The laminate had an initial flexural strength of 5.45 × 10⁴ psi., falling to 4.07 × 10⁴ psi. after boiling in water for 2 hours. A laminate prepared similarly from untreated cloth had an initial flexural strength of 4.11 × 10⁴ psi.

EXAMPLE 2

117.6 parts of methyl(γ-triethoxysilyl)propyloxyacetate prepared as described in Example 1 were added over a period of 20 minutes to 412 parts of diethylenetriamine, $NH(CH_2CH_2NH_2)_2$, whilst stirring continuously. During the addition the temperature of the reaction mixture increased from 18° to 20° C. and thereafter continued to rise, reaching a maximum of 26° C. 30 minutes after completion of the addition. The temperatures of the reaction mixture was then raised from 30° C to 120° C. over a period of 1 hour, after which methanol and excess diethylenetriamine were removed by distillation up to a pot temperature of 130° C. at 0.2 mm. Hg. There were thus obtained 137.2 parts of N(N-β-aminoethyl)-β-aminoethyl(γ-triethoxysilyl)propyloxyacetamide in the form of a clear, light yellow liquid. Analysis, Found, C, 47.8 per cent; H, 9.0 per cent; N, 12.0 per cent; Si, 7.96 per cent. Amine equivalent (as determined by titration with standard aqueous HCl) 366. N(N-γ-aminoethyl)-β-aminoethyl(γtriethoxysilyl)propyloxyacetamide, $C_{15}H_{35}O_5N_3Si$ requires C, 49.3 per cent; H, 9.6 per cent; N, 11.5 per cent; Si, 7.67 per cent, amino equivalent 365.

EXAMPLE 3

1030 parts of a siloxane having the average formula

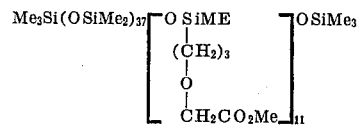

and 348 parts of N,N-diethylethylenediamine were heated with stirring to 150° C. and maintained there for 2 hours, methanol being removed by distillation. Products volatile up to 140° C. at 0.05 mm. Hg. were removed by distillation. There were thus obtained 1227 parts of a clear, water-insoluable oil of equivalent weight (—NEt₂) 540 (by acid titration). Calculated for

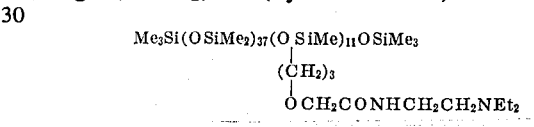

equivalent weight 520.

402 parts of the so prepared oil were mixed with 44.7 parts of glacial acetic acid and stirred for 2 hours at room temperature to give 446.7 parts of a clear water-soluble oil.

This oil was suitable for use as a foaming agent for water. A 1 per cent aqueous solution had a surface tension of 35 dynes/cm.

EXAMPLE 4

4.5 parts of the product of Example 3 of average formula

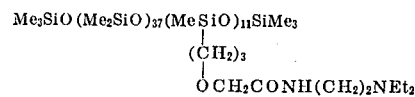

were heated to 70° C. and 1 part of a 30 per cent aqueous solution of hydrogen peroxide added dropwise with stirring over a period of 30 minutes. The mixture was then stirred for a further 4 hours at 70° C. and there was thereby obtained a clear homogeneous solution of the amine oxide of average formula

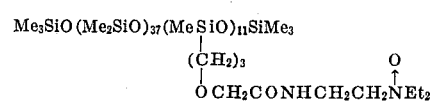

The original oil was immiscible with water. A 1 per cent aqueous solution of the amine oxide had a surface tension of 29.8 dynes/cm.

EXAMPLE 5

6 parts of the product of Example 3 of average formula

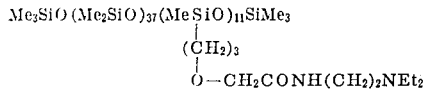

were added to a solution of 2 parts of ferric chloride in 80 parts of water. On shaking the mixture the siloxane dissolved to give a clear red-brown solution of the ferric chloride complex. This solution had a surface tension of 32.8 dynes/cm.

EXAMPLE 6

110 parts of hexamethylene diamine were dried by azeotropic distillation with 60 parts of toluene and 29.4 parts of methyl-γ-(triethoxysilyl)propyloxyacetate added to the stirred solution maintained at 130° C. After heating for 1 hour at this temperature infrared spectroscopy showed reaction to be complete (no ester C=O absorption). Unreacted amine and solvent were distilled off under reduced pressure and the residue further distilled. There were thus obtained 20 parts of N-6-aminohexyl-γ-(triethoxysilyl)propyloxyacetate in the form of a colorless liquid b.p. 200°–201° C./0.07 mm. Hg. (Found: C, 52.5, H, 10.8, N, 7.84 per cent; equivalent weight by acid titration 368. $C_{17}H_{38}O_5N_2Si$ requires C, 53.9, H, 10.1, N, 7.4 per cent; equivalent weight 378).

Heat cleaned glasscloth was treated in the manner described in Example 1 with a 1 per cent aqueous solution of the so prepared silane. The laminate so prepared had an initial flexural strength of $5.0 \times 10^4$ psi. and after boiling in water for 2 hours of $4.0 \times 10^4$ psi.

EXAMPLE 7

A mixture of 109 parts of N,N-dimethylaniline and 97 parts of a hydroxy-ended dimethylpolysiloxane of average composition $HO(SiMe_2O)_{6.3}H$ was added to a solution of 79.6 parts of methyl (γ-trichlorosilyl)propyloxyacetate in 1,000 parts of toluene, whilst stirring continuously. The temperature of the reaction mixture increased to 40° C. during the addition process, and thereafter the mixture was heated to 50° C. for 15 minutes and 20 parts of methanol added at that temperature. The mixture was then stirred and heated under reflux for 20 minutes, after which it was cooled to 25° C. and filtered to remove the precipitated N,N-dimethylaniline hydrochloride. The filtrate was added to 180 parts of 1,2-diaminoethane and the solution stirred and heated under reflux for 2 hours. After cooling and filtering, the solution was distilled to remove all materials volatile up to 105° C. at 0.5 mm. Hg. There were thus obtained 135 parts of a pale yellow oil having the average general formula

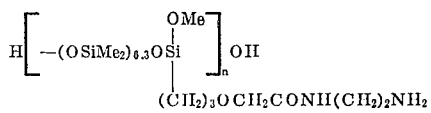

and of viscosity 584 cS at 25° C.

EXAMPLE 8

A solution of 49.5 parts of methyl allyloxyacetate in 200 parts of toluene containing 0.07 part of bis(diethylsulphide) platinous chloride was heated to 100° C. in an atmosphere of nitrogen and, whilst stirring, 200 parts of a linear polysiloxane of the average general formula $$Me_3SiO(MeHSiO)_{4.2}(Me_2SiO)_{33.8}SiMe_3$$

added at a rate such that the temperature of the reaction mixture remained in the range of 100°–110° C. during addition. The mixture was then heated under reflex for 3 hours and thereafter all material volatile up to a pot temperature of 130° C. at 0.05 mm. Hg. was removed by distillation. There was thus obtained a clear pale brown oil having the average general formula

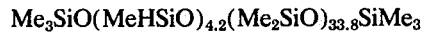

81 parts of the so prepared polysiloxane were added over a period of 10 minutes to 120 parts of 1,2-diaminoethane whilst stirring continuously. The mixture was thereafter stirred for 15 minutes, then heated under reflux for one hour. The methanol formed an excess 1,2-diaminoethane were thereafter removed by distillation up to a pot temperature of 120° C. at 0.05 mm. Hg. There were thus obtained 75 parts of a clear yellow-brown oil having the average general formula

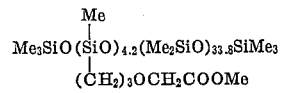

Calculated amine equivalent, 850; amine equivalent found by acid titration, 1030.

EXAMPLE 9

A mixture of 295 parts of the unsaturated dimethyl ester $$CH_2O(CH_2)_2COOCH_3$$
$$CH_2=CHCH_2OCH_2\overset{|}{C}HO(CH_2)_2COOCH_3$$

680 parts of a linear polysiloxane of the average general formula $Me_3SiO(MeHSiO)_{4.2}(Me_2SiO)_{33.8}SiMe_3$ and 0.23 part of bis(diethylsulphide)platinous chloride in 650 parts of toluene were stirred and heated under reflux for 2 hours in an atmosphere of nitrogen. Toluene was then removed by distillation until the pot temperature reached 160° C., after which the reaction mixture was maintained thereat for a further 1½ hours. All material volatile up to a temperature of 160° C. at 0.05 mm. Hg. pressure was removed by distillation. There were thus obtained 918 parts of a clear light yellow liquid having the average general formula $$Me_3SiO(MeSiO)_{4.2}[Me_2SiO]_{33.8}SiMe_3$$
$$\underset{|}{(CH_2)_3OCH_2CH.O(CH_2)_2COOMe}$$
$$\overset{|}{CH_2O(CH_2)_2COOMe}$$

and of viscosity 2,703 cS at 25° C.

A mixture of 474 parts of the so prepared siloxane and 143 parts of 3(diethylamino)-1-propylamine was heated to 160°–170° C. for 4 hours during which time a brisk stream of nitrogen was passed through the mixture and swept the volatile reaction products out of the reaction vessel and into a trap cooled to −70° C. where they condensed. In this way 28 parts of condensate were collected, which by infrared spectroscopic analysis were shown to consist almost entirely of methanol. All material volatile up to a temperature of 160°C at 0.1 mm. Hg. pressure was removed by distillation. There were thus obtained 565 parts of a clear light brown oil having the average general formula

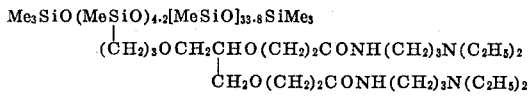

Calculated amine equivalent 580. Amine equivalent found by acid titration 540. Infrared spectroscopic analysis of the material confirmed the presence of the amide group and absence of the ester group.

EXAMPLE 10

108 parts of the product of Example 3 of formula

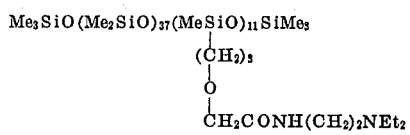

63 parts of methyl iodide and 50 parts of ethanol were mixed and maintained for 20 hours at 20° C. Materials volatile up to 100° C. at 15 mm. Hg. were then removed by distillation. There were thus obtained 127 parts of a clear viscous water-soluble liquid which was capable of use as a foaming agent for water. (Found: C, 35.3; H, 7.5; N, 4.0; Si, 17.8; I, 20.1 per cent. Calculated for $C_{223}H_{559}Si_{50}N_{22}O_{71}I_{11}$, C, 35.8; H, 7.50; Si, 18.7; N, 4.1; I, 18.7 per cent.)

EXAMPLE 11

A mixture of 345 parts of methyl allyloxyacetate and 400 parts of N,N-dimethyl-1,3-propylene diamine was stirred at 80°–120° C. for 7 hours. Fractional distillation of the product gave 544 parts of N-(N,N-dimethyl-1,3-propylene)allyloxyacetamide, b.p. 100° C. at 0.1 mm. Hg. (Found: C, 59.9, 59.6; H, 10.3, 10.1; N, 14.0, 14.0 per cent. $C_{10}H_{20}N_2O_2$ requires C, 60.0; H, 10.0; N, 14.0 per cent.)

A mixture of 40 parts of the so prepared compound, 13.4 parts of 1,1,3,3-tetramethyldisiloxane, 51 parts of toluene and 0.023 part of bis(diethylsulphide)platinous chloride was heated under reflux for 6 hours. Removal of solvent and unreacted starting materials by distillation under reduced pressure left 24 parts of a residue identified by infrared spectroscopy as $(Me_2N \cdot CH_2 \cdot CH_2 \cdot CH_{2b} \cdot NHCO \cdot CH_2 \cdot O \cdot CH_2 \cdot CH_2 \cdot CH_2 \cdot SiMe_2)_2O$. This material was insoluble in water but dissolved in dilute aqueous acid to give a solution of low surface tension.

What we claim is:

1. A new class of nitrogen-containing compounds comprising organosilicon compounds containing at least one unit of the average general formula

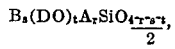

where A is a group of the general formula

in which R is an organic group free from olefinic unsaturation and having a valency of $c + 1$ and is selected from the group consisting of hydrocarbon groups having from three to 11 carbon atoms and groups consisting of carbon, hydrogen and oxygen, the latter in the form of ethereal linkages, having from six to 17 carbon atoms, $R^1$ is selected from the group consisting of lower alkylene groups, $R^2$ is selected from the group consisting of hydrogen and hydrocarbyl groups having not more than 12 carbon atoms, $R^3$ is a divalent radical attached at its extremities to two nitrogen atoms and is selected from the group consisting of hydrocarbon groups having not more than 12 carbon atoms, $R^4$ and $R^5$ are selected from the group consisting of hydrogen and hydrocarbyl groups, $c$, is 1, 2 or 3, B is a hydrocarbyl group free from aliphatic unsaturation, D is selected from the group consisting of hydrocarbyl groups and groups of the general formula $B(OC_nH_{2n})_x$, $r$ is 1 or 2, $s$ is 0, 1, 2 or 3, $t$ is 0, 1, 2 or 3 and $r+s+t$ is not greater than 4.

2. Nitrogen-containing compounds according to claim 1 wherein $r$ is 1 and R is a 1,3-propylene group.

3. Nitrogen-containing compounds according to claim 2 wherein $R^1$ is selected from the group consisting of methylene and 1,2-ethylene groups.

4. Nitrogen-containing compounds according to claim 1 wherein the group $R^2$ is selected from the group consisting of alkyl, aryl, aralkyl, alkenyl and cycloalkyl groups having not more than 12 carbon atoms, the group $R^3$ is a divalent hydrocarbon group selected from the group consisting of ethylene, 1,3-propylene 1,6-hexylene and 1,4-phenylene groups and the groups $R^4$ and $R^5$ are selected from the group consisting of alkyl, aryl and aralkyl groups.

5. Nitrogen-containing compounds according to claim 1 wherein the group B is present and is selected from the group consisting of methyl, ethyl, tetradecyl, octadecyl, cyclohexyl, phenyl, tolyl, benzyl, phenylethyl, chloromethyl, chlorophenyl, beta-cyanoethyl and gamma-cyanopropyl groups.

6. Nitrogen-containing compounds according to claim 1 wherein the group D is present and is selected from the group consisting of alkyl, aryl, aralkyl, alkaryl and cycloalkyl groups.

7. Nitrogen-containing compounds according to claim 1 wherein the organosilicon compound is a siloxane and the remainder of the units therein are selected from the group consisting of $Z_3SiO_{0.5}$, $Z_2SiO$, $ZSiO_{1.5}$ and $SiO_2$ in which the group Z is selected from the group consisting of substituted and unsubstituted hydrocarbyl groups.

8. Nitrogen-containing compounds according to claim 7 wherein the group Z is selected from the group consisting of halogen substituted, cyano-substituted and unsubstituted alkyl, aryl, aralkyl and cycloalkyl groups.

9. A nitrogen-containing compound according to claim 1 wherein the average general formula is

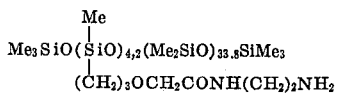

10. A process for the production of nitrogen-containing compounds as claimed in claim 1 comprising reacting an organosilicon compound containing at least one group of the general formula

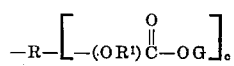

wherein R is an organic group free from olefinic unsaturation and having a valency of $c + 1$ and is selected from the group consisting of hydrocarbon groups having from three to 11 carbon atoms and groups consisting of carbon, hydrogen and oxygen, the latter in the form of ethereal linkages, having from six to 17 carbon atoms, $R^1$ is selected from the group consisting of lower alkylene groups, G is a hydrocarbyl group and $c$ is 1, 2 or 3, with an amino compound of the general formula

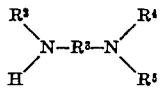

wherein $R^2$ is selected from the group consisting of hydrogen and hydrocarbyl groups having not more than 12 carbon atoms, $R^3$ is a divalent radical attached at its extremities to two nitrogen atoms and is selected from the group consisting of hydrocarbon groups having not more than 12 carbon atoms, $R^4$ and $R^5$ are selected from the group consisting of hydrogen and hydrocarbyl groups.

11. A process for the production of nitrogen-containing compounds as claimed in claim 1 comprising reacting a compound of the general formula

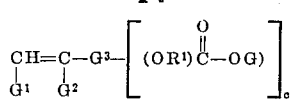

wherein $G^1$, $G^2$ and $G^3$ are groups such that the group

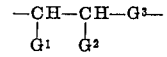

is the same as group $R^1$ which is selected from the group consisting of lower alkylene groups, G is a hydrocarbyl group and $c$ is 1, 2 or 3 with an amino compound of the general formula

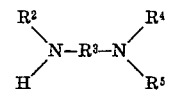

wherein $R^2$ is selected from the group consisting of hydrogen and hydrocarbyl groups having not more than 12 carbon atoms, $R^3$ is a divalent radical attached at its extremities to two nitrogen atoms and is selected from the group consisting of hydrocarbon groups having not more than 12 carbon atoms, $R^4$ and $R^5$ are selected from the group consisting of hydrogen and hydrocarbyl groups, and then reacting the product with an organosilicon compound containing at least one silicon-bonded hydrogen atom and having at least one unit of the general formula

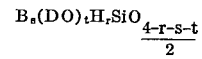

wherein B is a hydrocarbyl group free from aliphatic unsaturation, D is a hydrocarbyl group or a group of the general formula $B(OC_nH_{2n})_x$, $r$ is 1 or 2, $s$ is 0, 1, 2 or 3, $t$ is 0, 1, 2 or 3 and $r+s+t$ is not greater than 4, $n$ is 2, 3 or 4 and $x$ is an integer not greater than 100.

* * * * *